US012729721B2

(12) United States Patent
Yoneda et al.

(10) Patent No.: US 12,729,721 B2
(45) Date of Patent: Sep. 8, 2026

(54) OBJECT HOLDING STRUCTURE

(71) Applicant: IHI Corporation, Tokyo (JP)

(72) Inventors: Daigo Yoneda, Tokyo (JP); Yoshitaka Morooka, Tokyo (JP); Yuma Kunisaki, Tokyo (JP)

(73) Assignee: IHI Corporation, Tokyo (JP)

( * ) Notice: Subject to any disclaimer, the term of this patent is extended or adjusted under 35 U.S.C. 154(b) by 397 days.

(21) Appl. No.: 18/424,974

(22) Filed: Jan. 29, 2024

(65) Prior Publication Data

US 2024/0167516 A1 May 23, 2024

Related U.S. Application Data

(63) Continuation of application No. PCT/JP2022/031044, filed on Aug. 17, 2022.

(30) Foreign Application Priority Data

Nov. 4, 2021 (JP) ................................ 2021-180148

(51) Int. Cl.
*F16C 35/063* (2006.01)
*F16C 19/06* (2006.01)

(52) U.S. Cl.
CPC ............ *F16C 35/063* (2013.01); *F16C 19/06* (2013.01); *F16C 2360/23* (2013.01)

(58) Field of Classification Search
CPC .... F16C 35/063; F16C 19/06; F16C 2360/23; F16C 35/067; F16C 2300/22; F16C 2326/43
See application file for complete search history.

(56) References Cited

U.S. PATENT DOCUMENTS 3,464,474 A * 9/1969 Jansen .................... F16B 39/04 411/946
3,851,690 A * 12/1974 Wing ...................... F16B 39/10 411/948

(Continued)

FOREIGN PATENT DOCUMENTS

CN 111878512 A 11/2020
DE 10 2014 213 505 A1 1/2016

(Continued)

OTHER PUBLICATIONS

International Search Report issued Nov. 1, 2022 in PCT/JP2022/031044 filed on Aug. 17, 2022, citing documents 4-5 & 15-16 therein, 2 pages.

(Continued)

*Primary Examiner* — Eugene G Byrd
(74) *Attorney, Agent, or Firm* — Oblon, McClelland, Maier & Neustadt, L.L.P.

(57) ABSTRACT

An object holding structure includes: an inner member including an end surface, a first clamping surface located radially outward of the end surface, and hook portions arranged in a circumferential direction at intervals on the end surface; an outer member located radially outward of the inner member, including an end surface and a second clamping surface opposed to the first clamping surface through an object; a key plate contactable to the end surface and the end surface; and a retaining ring held between the key plate and claw portions of the hook portions. The key plate includes a first ring facing the end surface, a second ring provided radially inward of the hook portions, and inner tabs located between the hook portions and linking the first ring and the second ring.

14 Claims, 8 Drawing Sheets

(56) References Cited

U.S. PATENT DOCUMENTS 5,795,037 A * 8/1998 Hagelthorn ............ B60B 27/02 301/124.1
7,927,052 B1 * 4/2011 Varden ................. F16B 39/108 411/197
2006/0222280 A1 * 10/2006 Harada .................. F16B 21/18 384/561
2007/0217728 A1 * 9/2007 Kashiwagi ........... B60B 27/001 384/589
2008/0153683 A1 * 6/2008 Kirkpatrick ............ F16C 35/06 384/537
2009/0034896 A1 2/2009 Fisher et al.
2011/0097174 A1 4/2011 Varden
2013/0156589 A1 6/2013 Paquet et al.
2014/0302960 A1 10/2014 Hartman et al.
2015/0219076 A1 * 8/2015 Wendeberg ............ F03D 13/10 416/174
2018/0283456 A1 10/2018 Carter et al.
2019/0120279 A1 4/2019 Wiltgen et al.
2021/0048065 A1 2/2021 Bohnert et al.
2021/0246940 A1 * 8/2021 Charvet-Quemin ......................... F16C 41/007
2024/0167516 A1 * 5/2024 Yoneda ................ F16C 35/063

FOREIGN PATENT DOCUMENTS

EP 1 400 713 A2 3/2004
JP 47-33331 12/1972
JP 2008303981 A * 12/2008 ........... F16C 35/063
JP 2009127803 A * 6/2009 ............. F16C 19/46
WO WO 2021/165265 A1 8/2021

OTHER PUBLICATIONS

Extended European Search Report Issued Jul. 25, 2025 in European Patent Application No. 22889638.7, citing documents 1-2 & 15-16 therein, 6 pages.

Japanese Office Action issued on Jun. 18. 2024 in Japanese Patent Application No. 2023-557629 (with unedited computer- generated English translation), citing document 15 therein, 4 pages.

* cited by examiner

61(60)
S
20
30
10A
40
50
Z
AD
BACK
FRONT

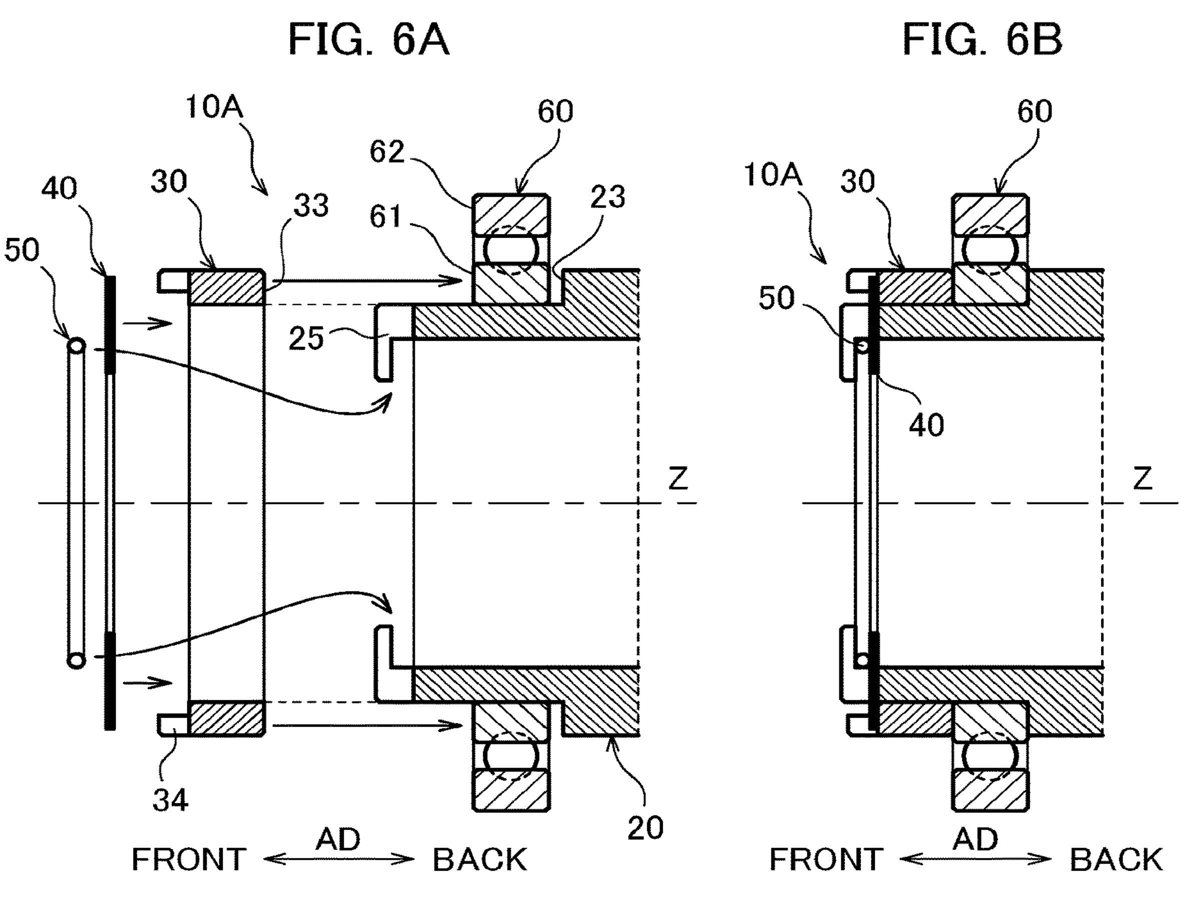
FIG. 6A
FIG. 6B
10A
60
62
61
23
33
30
40
50
25
Z
34
20
FRONT
AD
BACK
10A
30
60
50
40
Z
FRONT
AD
BACK
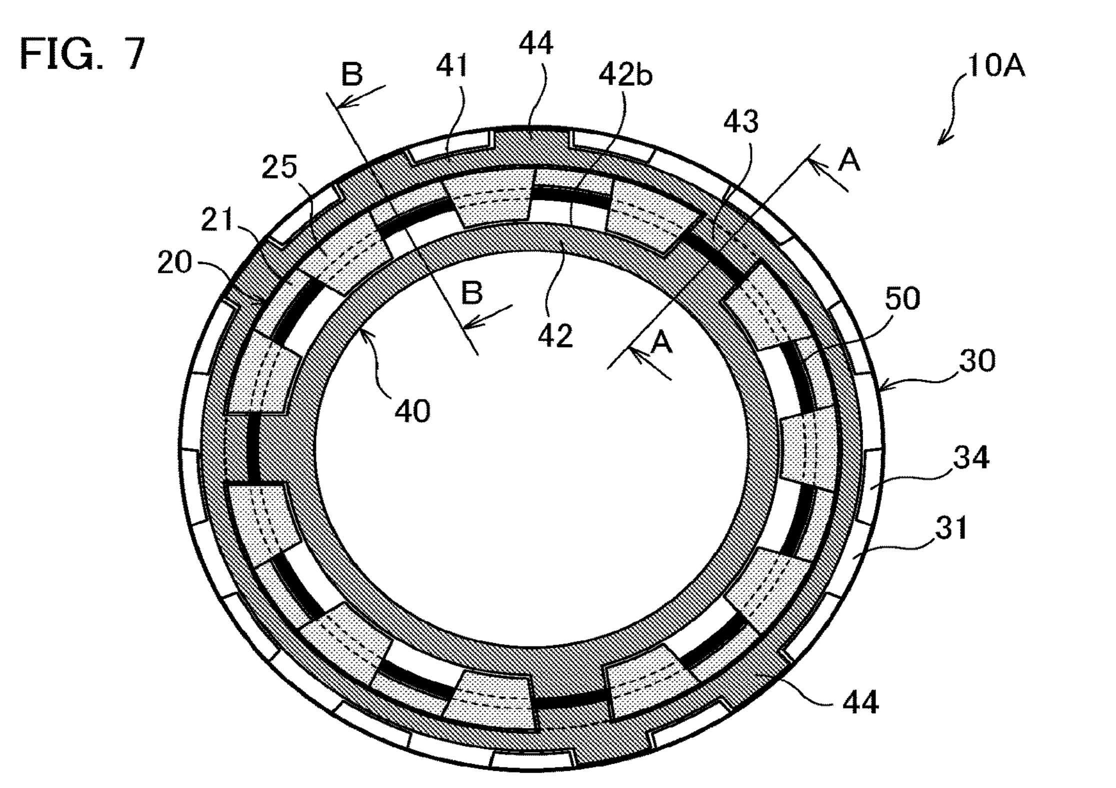
FIG. 7
B
41
44
42b
10A
43
A
25
21
20
B
42
A
50
40
30
34
31
44

OBJECT HOLDING STRUCTURE

CROSS-REFERENCE TO RELATED APPLICATIONS

The present application is a continuation application of International Application No. PCT/JP2022/031044, now WO 2023/079813 A1, filed on Aug. 17, 2022, which claims priority to Japanese Patent Application No. 2021-180148, filed on Nov. 4, 2021, the entire contents of which are incorporated by reference herein.

BACKGROUND OF THE INVENTION

Technical Field

The present disclosure relates to a structure for holding an object such as a bearing.

Background

US 2009/0034896 A1 discloses a bearing holding structure applied in an aircraft jet engine. An inner ring of the bearing is installed on an outer peripheral surface of an extension which integrally rotates with a shaft. The inner ring is held by being pressed forward with a spanner nut. On the other hand, an outer ring of the bearing is installed on an inner peripheral surface of a bearing housing.

A retainer is provided in front of the outer ring. The retainer is screwed into the bearing housing. Thereby, the retainer is moved backward and pushes the outer ring backward. The retainer has a hook portion. The retainer is fixed to the bearing housing with a bolt while the hook portion is hung on the bearing housing.

SUMMARY OF THE INVENTION

Generally speaking, as shown in US 2009/0034896 A1, the retainer is fixed to an outer member such as a bearing housing with a combination of a hook portion and a bolt. In order to provide the hook portion to the retainer, it is necessary to partially increase the diameter of the outer member. However, if it is impossible to increase the sizes of the retainer and the outer member due to the influence of peripheral components, this mechanism cannot be adopted. In the bearing holding structure disclosed in US 2021/0048065 A1 and US 2018/0283456 A1, such an increase in size can be avoided. However, since the number of parts increases instead, an increase in weight and cumbersome assembly are concerned. In addition, since the strength may be reduced due to the hole machining of the inner member, it is not suitable to be applied to a rotating body such as a shaft which is excessively loaded by centrifugal force during operation.

The present disclosure has been made in view of the above-mentioned circumstances, and is intended to provide an object holding structure capable of preventing misassembly while suppressing excessive increase in the number and weight of parts.

An object holding structure according to the first aspect of the present disclosure includes: an inner member extending in an axial direction, including: an end surface, a first clamping surface located radially outward of the end surface when viewed from the axial direction, and hook portions arranged in a circumferential direction at intervals on the end surface and having claw portions extending radially inwardly; an outer member located radially outward of the inner member and movably provided in the axial direction relative to the inner member, the outer member including an end surface and a second clamping surface facing the first clamping surface through an object; a key plate contactable to each of the end surface of the inner member and the end surface of the outer member; a retaining ring held between the key plate and the claw portions of the hook portions; and wherein the key plate includes: a first ring facing the end surface of the outer member; a second ring provided radially inward of the hook portions when viewed from the axial direction; inner tabs located between the hook portions in the circumferential direction and linking the first ring and the second ring.

An object holding structure according to the second aspect of the present disclosure includes: an outer member extending in an axial direction, including: an end surface, and a first clamping surface located radially inward of the end surface when viewed from the axial direction; an inner member located radially inward of the outer member and movably provided in the axial direction relative to the outer member, the inner member including: an end surface, a second clamping surface facing the first clamping surface through an object, and hook portions arranged in a circumferential direction at intervals on the end surface and having claw portions extending radially inwardly; a key plate contactable to each of the end surface of the inner member and the end surface of the outer member; a retaining ring held between the key plate and the claw portions of the hook portions; and wherein the key plate includes: a first ring facing the end surface of the outer member; a second ring provided radially inward of the hook portions when viewed from the axial direction; inner tabs located between the hook portions in the circumferential direction and linking the first ring and the second ring.

The second ring may include an inclined portion provided at an inner edge portion located radially inwardly. The inclined portion may be formed in an annular shape extending in the circumferential direction, and the inclined portion may be inclined to a side where the retaining ring is located with respect to a virtual plane including the first ring so that a distance from the virtual plane increases as the inclined portion approaches a center of the second ring. The inclined portion may be entirely formed in the second ring.

The second ring may include a tongue portion provided at an inner edge portion located radially inwardly. The tongue portion may be formed in an annular shape extending in the circumferential direction, and the tongue portion may protrude from the inner edge portion on a side where the retaining ring is located relative to the virtual plane so that the tongue portion gets away from a virtual plane including the first ring.

Each of the inner tabs may include a pair of flanges obliquely extending from both sides thereof in the circumferential direction toward the end surface of the outer member. The key plate may be formed of a single metal plate. Each of the inner tabs may include a pair of flanges obliquely extending from edges on both sides in the circumferential direction to a side opposite to the side where the retaining ring is located relative to the virtual plane including the first ring.

The outer member may include projections on the end surface of the outer member, located radially outward of the first ring of the key plate. The key plate may include outer tabs located radially outward of the first ring. The projections may be arranged at intervals in the circumferential direction. Each of the outer tabs may extend radially outward from the first ring at least to a position between the projections.

According to the present disclosure, it is possible to provide an object holding structure capable of preventing misassembly while suppressing excessive increase in the number and weight of parts.

BRIEF DESCRIPTION OF DRAWINGS

FIGS. 6A and 6B are cross-sectional views for explaining an assembly of the object holding structure according to the first embodiment of the present disclosure, wherein FIG. 6A shows a state before assembly and FIG. 6B shows a state after assembly.

FIG. 7 is a front view of the object holding structure according to the first embodiment of the present disclosure after assembly.

FIGS. 8A and 8B are partial cross-sectional views of the object holding structure shown in FIG. 7, wherein FIG. 8A is a cross-sectional view along the line A-A in FIG. 7 and FIG. 8A is a cross-sectional view along the line B-B in FIG. 7.

FIGS. 9A and 9B are views showing the positional relationship between the retaining ring and the key plate in the hook portion when viewed from the radial direction, wherein FIG. 9A shows a state in which the retaining ring is properly assembled and FIG. 9A shows a state in which the retaining ring wound be improperly assembled.

FIGS. 10A and 10B are cross-sectional views for explaining the assembly of the object holding structure according to the second embodiment of the present disclosure, wherein FIG. 10A shows a state before assembly and FIG. 10B shows a state after assembly.

FIGS. 11A and 11B are cross-sectional views showing a modified example of the object holding structure according to the second embodiment, wherein FIG. 11A shows a state before assembly and FIG. 11B shows a state after assembly.

FIGS. 12A to 12D are views showing several modified examples of the key plate according to the embodiments of the present disclosure, wherein FIG. 12A is a cross-sectional view of the first modified example along the axial direction, FIG. 12B is a cross-sectional view of the second modified example along the axial direction, FIG. 12C is a front view showing a part of the third modified example, and FIG. 12D is a cross-sectional view of the third modified example along the circumferential direction.

DESCRIPTION OF EMBODIMENTS

Figure 1:
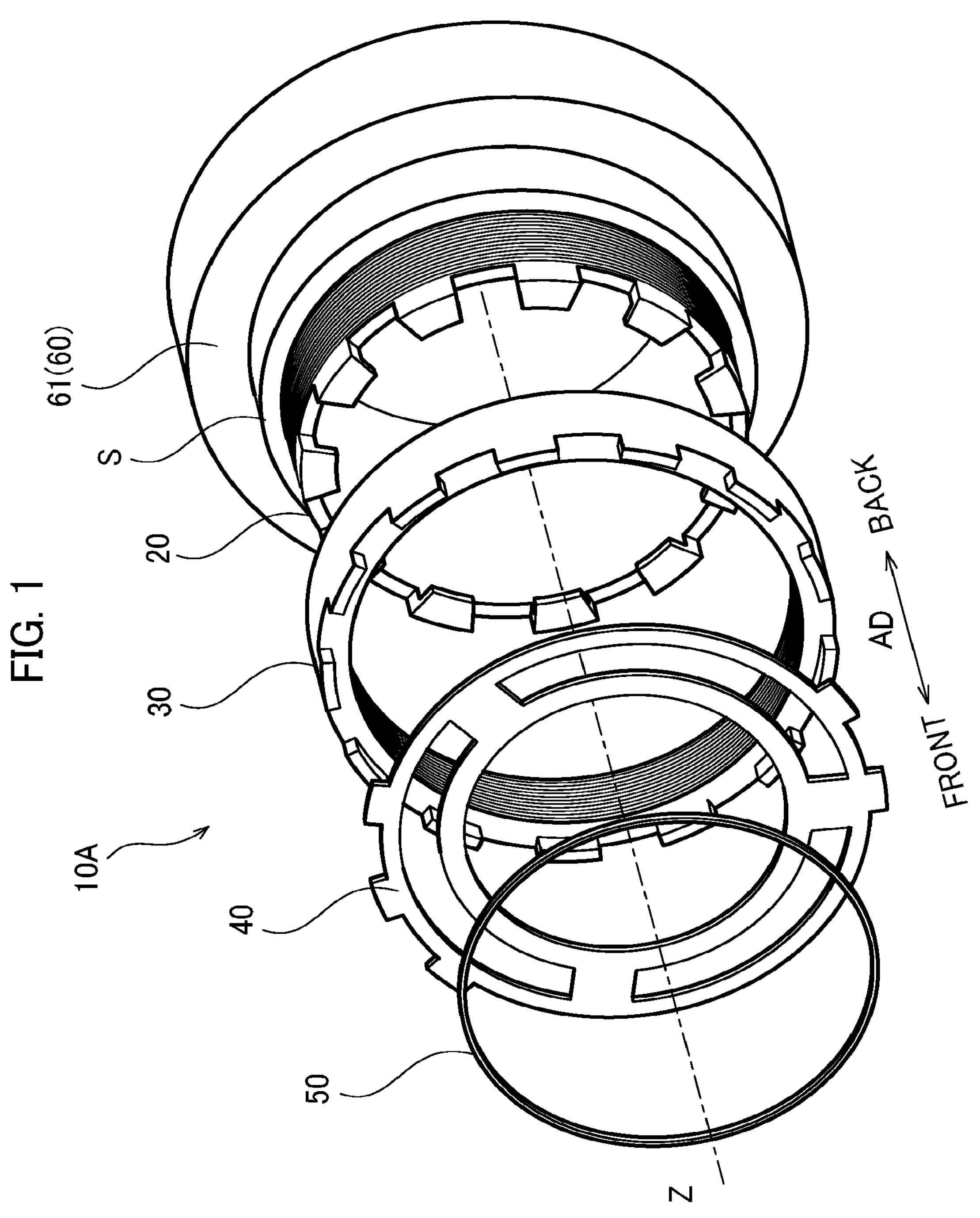
FIG. 1 is an exploded perspective view showing an example of an object holding structure according to the first embodiment of the present disclosure.

Hereinafter, an object holding structure 10A according to embodiments of the present disclosure will be described. The same reference numerals will be used for common parts in each figure, and duplicate descriptions therefor will be omitted. The object holding structure 10A is configured to hold an annular or a disk-shaped object by regulating the axial movement of the object. For example, as described below, the object holding structure 10A is provided at the end of a shaft and is used to hold a bearing 60 that rotatably supports the shaft. Hereinafter, for convenience of explanation, a Z-axis is defined as a reference axis of the entire object holding structure 10A, and its extension direction is referred to as the axial direction AD. Further, a circumferential direction CD and a radial direction RD are defined with reference to the Z-axis.

First Embodiment

The object holding structure 10A according to the first embodiment will be described below. FIG. 1 is an exploded perspective view showing an example of the object holding structure 10A according to the first embodiment. For convenience of explanation, a diagonally forward left side of FIG. 1 is defined as "front", and a diagonally backward right side of FIG. 1 is defined as "back". Note that a spacer S shown in FIG. 1 can be appropriately omitted depending on the specification.

The object holding structure 10A according to the present embodiment holds an inner ring 61 of the bearing 60 as an example of the object to be held. As shown in FIG. 1, the object holding structure 10A includes a shaft 20 as an inner member, a lock nut 30 as an outer member, a key plate 40, and a retaining ring 50.

Figure 2:
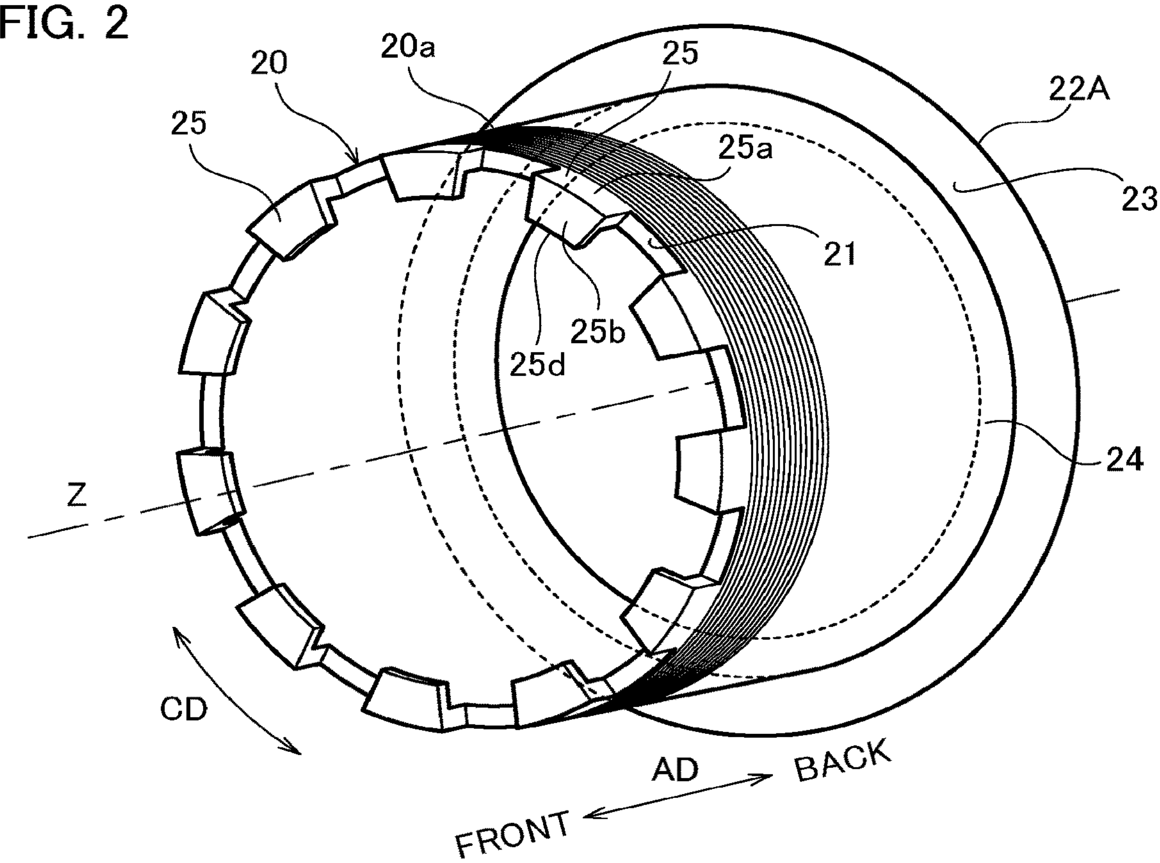
FIG. 2 is a perspective view showing a shaft as an example of an inner member according to the first embodiment of the present disclosure.

FIG. 2 is a perspective view showing the shaft 20 as an example of an inner member according to the present embodiment. The shaft 20 is a hollow rod-shaped member (i.e., a tubular member) centered on the Z-axis and extends in the axial direction AD. The shaft 20 is rotated by a rotary driving device such as a turbine. The shaft 20 has an end surface 21 facing forward and an annular projection 22A (stopper). The annular projection 22A protrudes radially outward from the outer peripheral surface 24 of the shaft 20 and is formed in an annular shape centered on the Z-axis.

The annular projection 22A includes a first clamping surface 23 facing forward (i.e., facing the object to be held). The first clamping surface 23 is positioned radially outward of the end surface 21 when viewed from the axial direction AD. Instead of providing the annular projection 22A, a step may be provided on the outer peripheral surface 24 of the shaft 20 so that the diameter (outer diameter) of the outer peripheral surface 24 of the shaft 20 is decreased at the front end 20*a* of the shaft 20, and the step may form the first clamping surface 23. In either case, after the inner ring 61 of the bearing 60 is attached to the shaft 20 from the end surface 21 side, the inner ring 61 is restricted in further movement along the Z-axis by abutting on the first clamping surface 23.

The lock nut 30 is screwed to the end 20*a* of the shaft 20 in a state where the bearing 60 is attached to the shaft 20. The lock nut 30 is positioned radially outward of the shaft 20 and is movably provided in the axial direction AD with respect to the shaft 20 by its own rotation.

As shown in FIG. 2, the shaft 20 includes hook portions 25. The hook portions 25 are provided on the end surface 21 at intervals in the circumferential direction CD. A tip of each hook portion 25 has a shape which is curved radially inwardly. Specifically, each hook portion 25 has a leg portion 25*a* projecting forward from the end surface 21 and a claw portion 25*b* extending radially inward from the leg portion 25*a* (see FIGS. 8A and 8B).

Figure 8A:
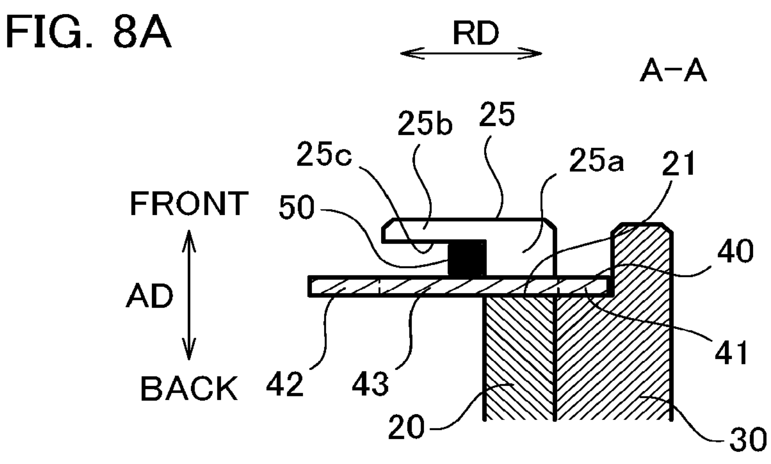

The length of the leg portion 25*a* along the axial direction AD has a value such that the distance between the inner surface 25*c* of the claw portion 25*b* and the end surface 21 along the axial direction AD is equal to or greater than a thickness of the retaining ring 50 and the inner tab 43 of the key plate 40 that are overlapped (see FIG. 8A). Since such a length is set to the leg portion 25*a*, the retaining ring 50 and the key plate 40 can be easily attached to the shaft 20. In addition, excessive pressing by the claw portion 25*b* against both of them can be avoided to prevent the occurrence of deformation.

The length of the claw portion 25*b* along the radial direction RD has a value such that the retaining ring 50 can be accommodated inside the hook portions 25 and the claw portions 25*b* do not interfere with the second ring 42 of the key plate 40 when the key plate 40 is mounted. Therefore, when viewed from the axial direction AD, the tips 25*d* of the claw portions 25*b* are located radially outward of an outer edge 42*b* of the second ring 42 (see FIG. 7).

Figure 3:
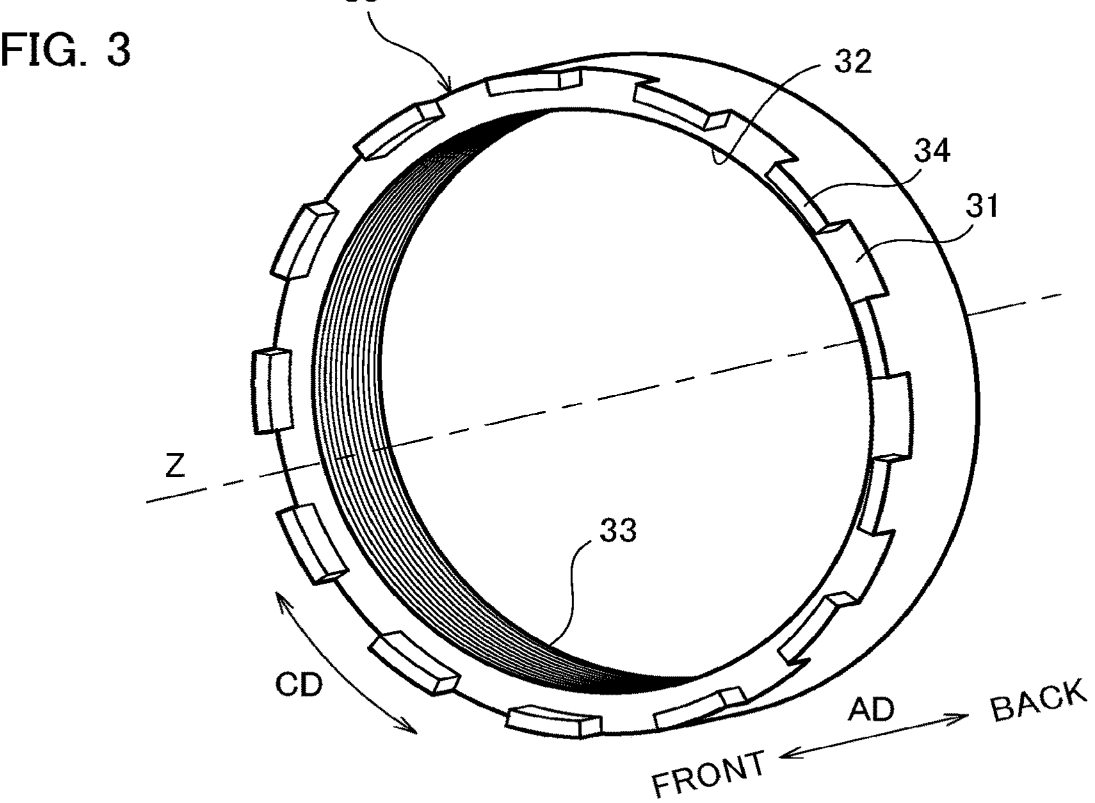
FIG. 3 is a perspective view showing an example of a lock nut according to the first embodiment of the present disclosure.

FIG. 3 is a perspective view showing an example of the lock nut 30 according to the present embodiment. The lock nut 30 is an annular member having an annular cross section centered on the Z-axis and extending in the axial direction AD. The lock nut 30 extends in the axial direction AD by a predetermined length so that the inner ring 61 of the bearing 60 is held between the lock nut 30 and the shaft 20 in the axial direction AD. The lock nut 30 includes an end surface 31 facing forward and a second clamping surface 33 facing backward (i.e., facing the object to be held). When viewed from the axial direction AD, the end surface 31 and the second clamping surface 33 overlap each other. The second clamping surface 33 faces the first clamping surface 23 through an inner ring 61 or the like of the bearing 60.

The lock nut 30 is provided with an attachment hole 32 into which the shaft 20 is inserted and screwed. The attachment hole 32 is formed around the Z-axis as the central axis thereof and extends from the second clamping surface 33 to the end surface 31. That is, the attachment hole 32 penetrates between the end surface 31 and the second clamping surface 33.

When the lock nut 30 moves backward, the second clamping surface 33 abuts against the inner ring 61 (or the spacer S if the spacer S is provided). Thereby, the movement of the inner ring 61 forward and backward is restricted and held. The structure such as the spacer S may be positioned between the first clamping surface 23 and the inner ring 61, or between the second clamping surface 33 and the inner ring 61.

The lock nut 30 may include projections 34. The projections 34 are positioned radially outward of the first ring 41 of the key plate 40 on the end surface 21. The projections 34 project forward from the end surface 31 and are arranged at intervals in the circumferential direction CD on the same circle centered at a point on the Z-axis. The intervals in the circumferential direction are longer than the widths of the outer tabs 44 along the circumferential direction CD, which are provided on the key plate 40.

Figure 4:
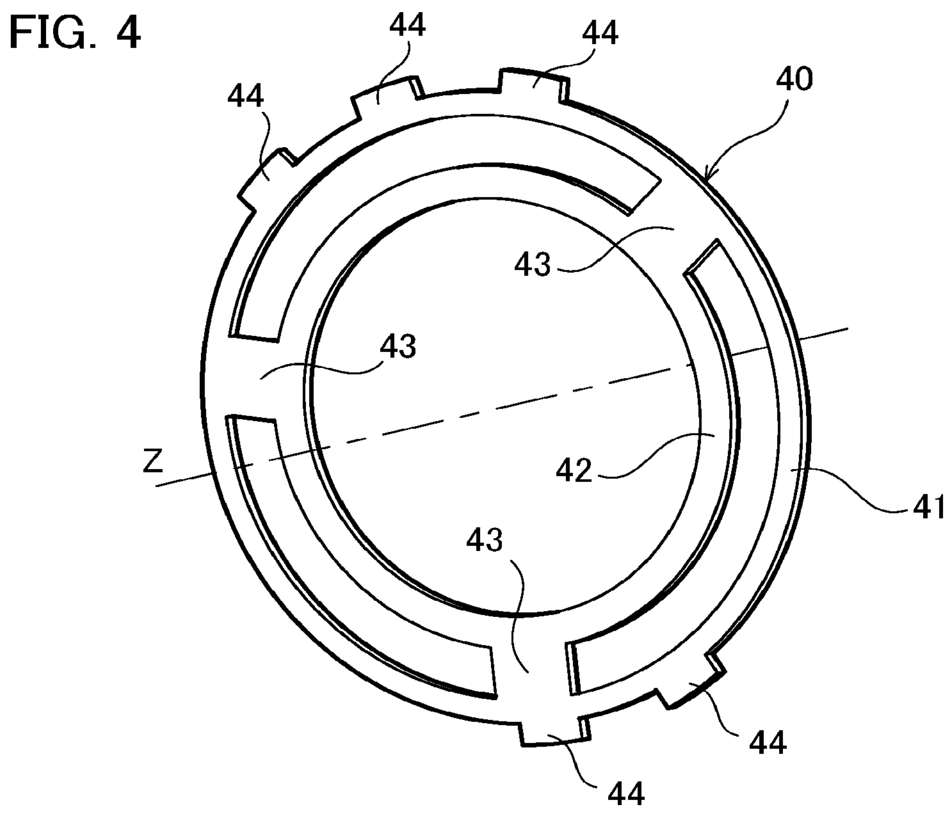
FIG. 4 is a perspective view showing an example of a key plate according to the first embodiment of the present disclosure.

FIG. 4 is a perspective view showing an example of the key plate 40 according to the present embodiment. The key plate 40 is provided to be contactable with the end surface 21 of the shaft 20 and the end surface 31 of the lock nut 30 (see FIG. 6). The key plate 40 includes a first ring 41, a second ring 42, and inner tabs 43. The first ring 41, the second ring 42, and the inner tabs 43 all have the same thickness and are arranged on the same plane. Thus, the key plate 40 may be formed of, for example, a single metal plate. In this case, a joining process such as welding between the components is not required, and easy manufacturing is possible.

The first ring 41 faces the end surface 31 of the lock nut 30. The second ring 42 is provided radially inward of the hook portions 25 when viewed from the axial direction AD. The inner tabs 43 are located between the hook portions 25 in the circumferential direction CD and connect the first ring 41 and the second ring 42. The number of inner tabs 43 is arbitrary as long as it does not affect the maintenance of the overall shape of the key plate 40.

The key plate 40 may include outer tabs 44 disposed radially outward of the first ring 41. The outer tabs 44 extend from the outer edge of the key plate 40 to positions between mutually adjacent two of the projections 34. The number of outer tabs 44 is arbitrary.

Figure 5:
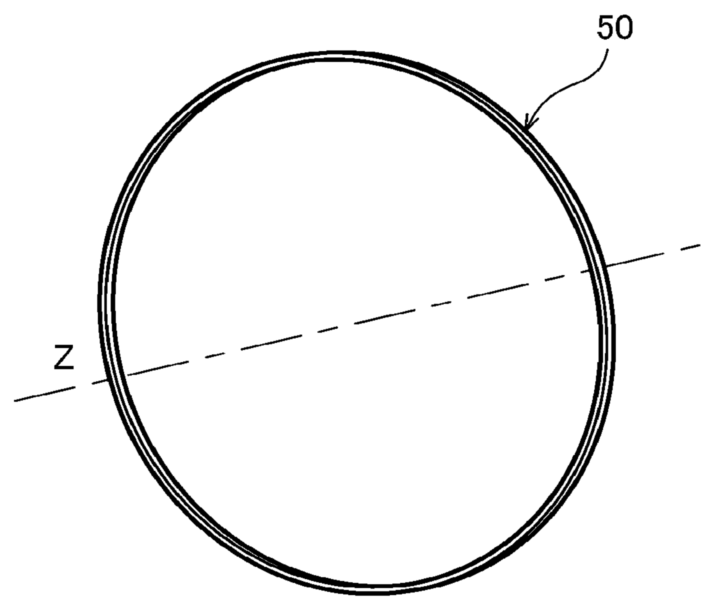
FIG. 5 is a perspective view showing an example of a retaining ring according to the first embodiment of the present disclosure.

FIG. 5 is a perspective view showing an example of the retaining ring 50 according to the present embodiment. The retaining ring 50 is held between the claw portions 25*b* of hook portions 25 and the key plate 40. Accordingly, the outer diameter and the inner diameter of the retaining ring 50 are set so that the retaining ring 50 overlaps the claw portion 25*b* when viewed from the axial direction AD. The retaining ring 50 is formed of a long and thin metal bar wire or the like from the viewpoint of weight reduction and allowing deformation of the radial direction RD during assembly. The retaining ring 50 may be continuous to the circumferential direction CD as a so-called O-ring or may be interrupted in the middle thereof in the circumferential direction CD as a so-called C-ring.

Figure 8B:
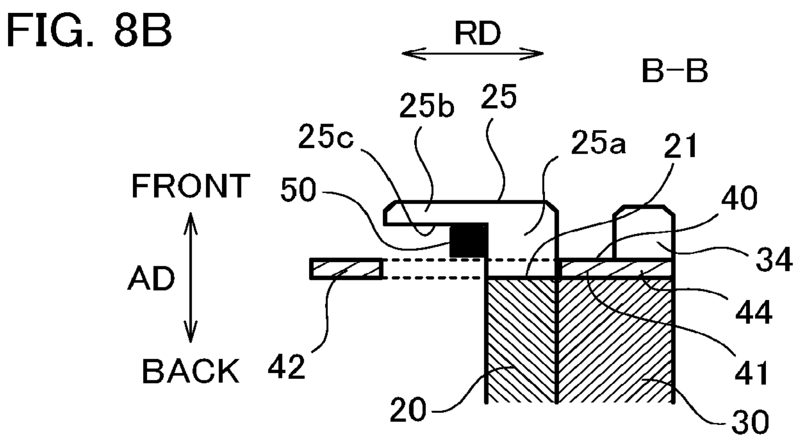

Next, the assembly of the object holding structure 10A will be described. FIGS. 6A and 6B are cross-sectional views for explaining the assembly of the object holding structure 10A, wherein FIG. 6A shows a state before assembly and FIG. 6B shows a state after assembly. FIG. 7 is a front view of the object holding structure 10A after assembly. FIG. 8A is a cross-sectional view along the line A-A in FIG. 7, and FIG. 8B is a cross-sectional view along the line B-B in FIG. 7.

First, the inner ring 61 of the bearing 60 is attached to the shaft 20 and moved backward until it comes into contact with the first clamping surface 23. Next, the lock nut 30 is attached to the shaft 20 and screwed into the shaft 20. When the lock nut 30 is rotated, the lock nut 30 moves backward. The lock nut 30 is rotated until the second clamping surface 33 of the lock nut 30 comes into contact with the inner ring 61 of the bearing 60.

Next, the posture of the key plate 40 is adjusted so that the key plate 40 faces each of the end surface 21 of the shaft 20 and the end surface 31 of the lock nut 30. In addition, the phase of the key plate 40 with respect to the arrangement of the hook portions 25 is adjusted so that each inner tab 43 of the key plate 40 is positioned between two adjacent to each other among the hook portions 25. Thereafter, the key plate 40 approaches until it comes into contact with each end surface.

When the projections 34 are provided on the end surface 21 of the lock nut 30 and the outer tabs 44 are provided to the key plate 40, the lock nut 30 may be slightly rotated such that the outer tabs 44 are located between mutually adjacent two of the projections 34 during the phase adjustment described above.

Next, the retaining ring 50 is attached to be housed inside the hook portions 25, and thereby the assembly is completed. At this time, as shown in FIG. 7, the hook portions 25 penetrate the key plate 40 through the first ring 41 and the second ring 42 of the key plate 40. Further, each inner tab 43 of the key plate 40 is positioned between mutually adjacent two of the hook portions 25. Accordingly, the key plate 40 is properly positioned relative to the arrangement of the hook portions 25, and the rotation of the circumferential CD of the key plate 40 is restricted.

Further, as shown in FIGS. 8A and 8B, when viewed from the circumferential CD, the retaining ring 50 is positioned between the claw portions 25*b* of the hook portions 25 and the key plate 40, and is held by the hook portions 25. Consequently, the key plate 40 is prevented from falling off.

Figure 9A:
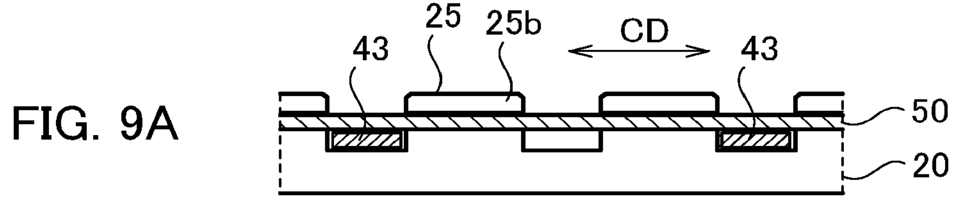
Figure 9B:
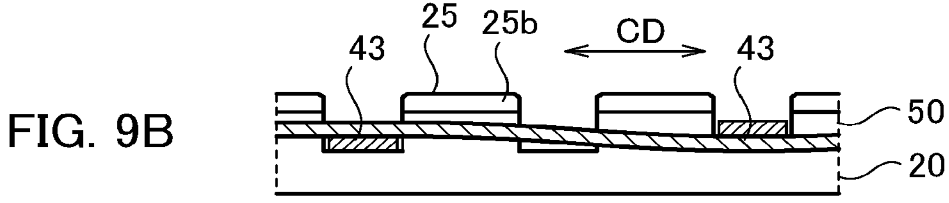

FIGS. 9A and 9B are views showing the positional relationship between the retaining ring 50 and the key plate 40 in the hook portion 25 when viewed from the radial direction RD, wherein FIG. 9A shows a state in which the retaining ring 50 is properly assembled and FIG. 9B shows a state in which the retaining ring 50 would be improperly assembled.

If the lock nut 30 is loosened and moved forward due to a disturbance such as rotation or vibration of the shaft 20, the lock nut 30 comes in contact with the key plate 40. The reaction force from the key plate 40 caused by this contact suppresses the rotation of the lock nut 30 in the direction in which the lock nut 30 is loosened, and the unexpected movement of the inner ring 61 of the bearing 60 is also restricted. That is, the bearing 60 is stably held at the end 20*a* of the shaft 20.

When the projections 34 are provided on the end surface 31 of the lock nut 30 and the outer tabs 44 are provided on the key plate 40, any of the projections 34 of the lock nut 30 come into contact with the outer tab 44 when the lock nut 30 is rotated in the loosening direction. The rotation of the key plate 40 in the circumferential CD is restricted by the hook portions 25 of the shaft 20 penetrating the key plate 40. Therefore, the rotation of the lock nut 30 in contact with the outer tab 44 is also restricted. Accordingly, the rotation of the lock nut 30 can be more firmly restricted by the introduction of the projections 34 and the outer tabs 44.

The restriction of rotation of the lock nut 30 described above assumes that the key plate 40 is properly attached. In other words, it is essential that the retaining ring 50 is positioned between the hook portions 25 and the key plate 40 in a state where the key plate 40 faces the end surface 21 of the shaft 20.

However, the retaining ring 50 is formed of a long and thin metal bar wire or the like from the viewpoint of weight reduction and allowing radial deformation. Therefore, when attaching the retaining ring 50, there is a possibility that a part of the retaining ring 50 gets between the key plate 40 and the end surface 21 of the shaft 20 through a space radially inside the key plate 40 (see FIG. 9B). In this case, the pressing of the retaining ring 50 to the key plate 40 is partially weakened, and there is a concern that the lock nut 30 is easily loosened by vibration or the like.

Therefore, the key plate 40 according to the present embodiment has a second ring 42 provided radially inward of the hook portions 25 when viewed from the axial direction AD. The second ring 42 is continuously extended in the circumferential direction CD. That is, the inner diameter of the second ring 42 is sufficiently smaller than the outer diameter of the retaining ring 50. Therefore, when attaching the retaining ring 50, even if a part of the retaining ring 50 enters a region surrounded by the second ring 42, the second ring 42 immediately contacts the retaining ring 50 and further entry is restricted. Moreover, the key plate 40 and the retaining ring 50 are finally arranged substantially in parallel. Therefore, even if a part of the retaining ring 50 temporarily enters the region surrounded by the second ring 42, the retaining ring 50 is guided to take the posture parallel with the key plate 40 due to the contact with the second ring 42. Accordingly, it is possible to prevent the occurrence of a state in which a part of the retaining ring 50 gets between the key plate 40 and the end surface 21 of the shaft 20, as shown in FIG. 9B. In other words, it is possible to prevent the mis-attachment of the retaining ring 50 and stably hold the inner ring 61 of the bearing 60 as an object to be hold while suppressing the looseness of the lock nut 30.

As described above, the hook portions 25 and the shaft 20 are integrally formed of the same base material. Also, when the projections 34 are provided in the lock nut 30, the projections 34 and the lock nut 30 are integrally formed of the same base material. Therefore, it is possible to suppress excessive increase in the number of parts and the weight. In addition, it is possible to suppress excessive expansion of the occupied space of the object holding structure 10A.

Second Embodiment

Figure 10A:
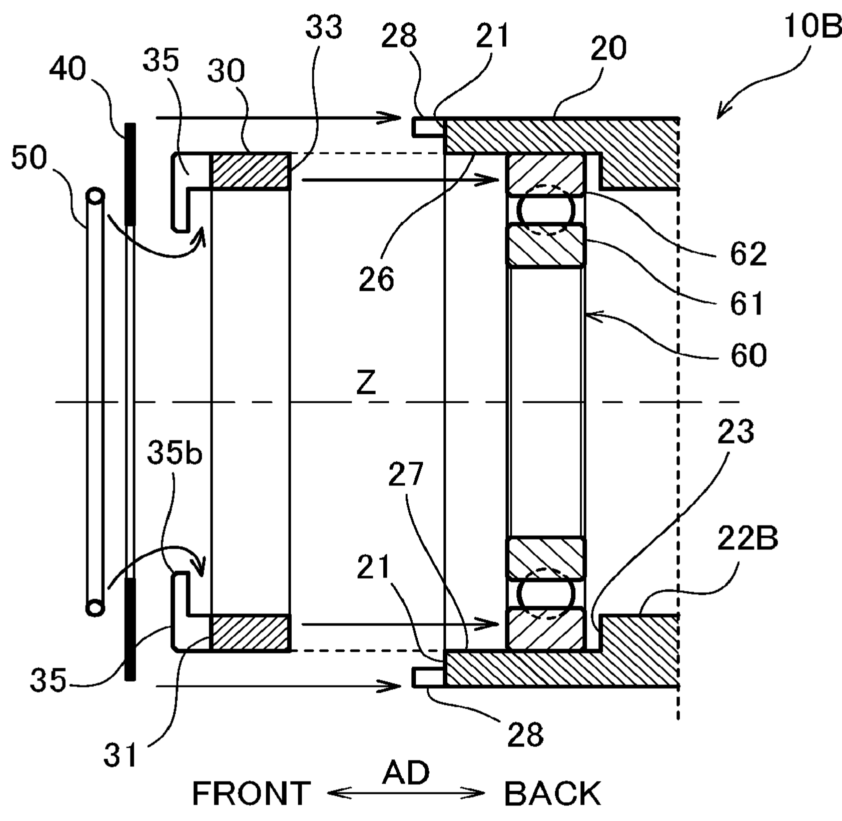
Figure 10B:
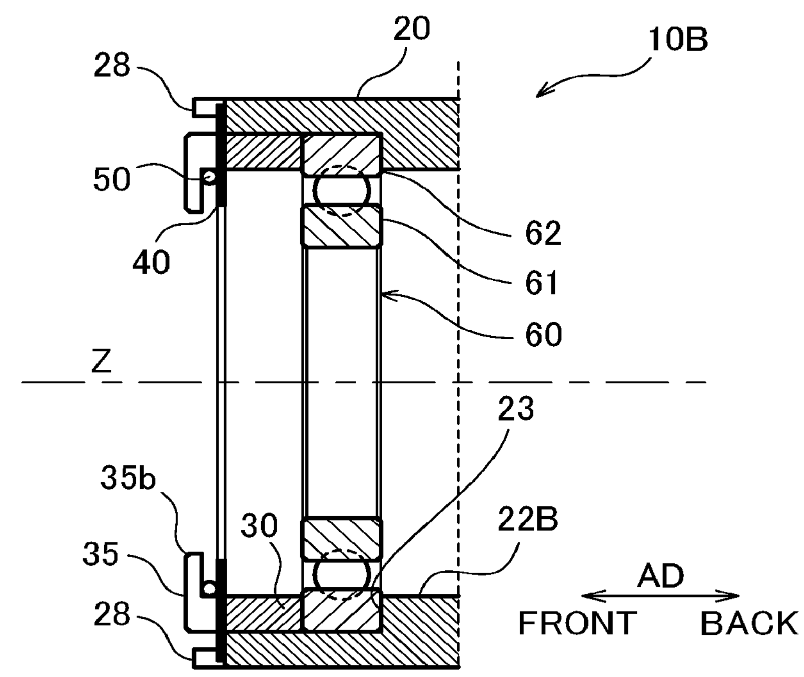
Figure 11A:
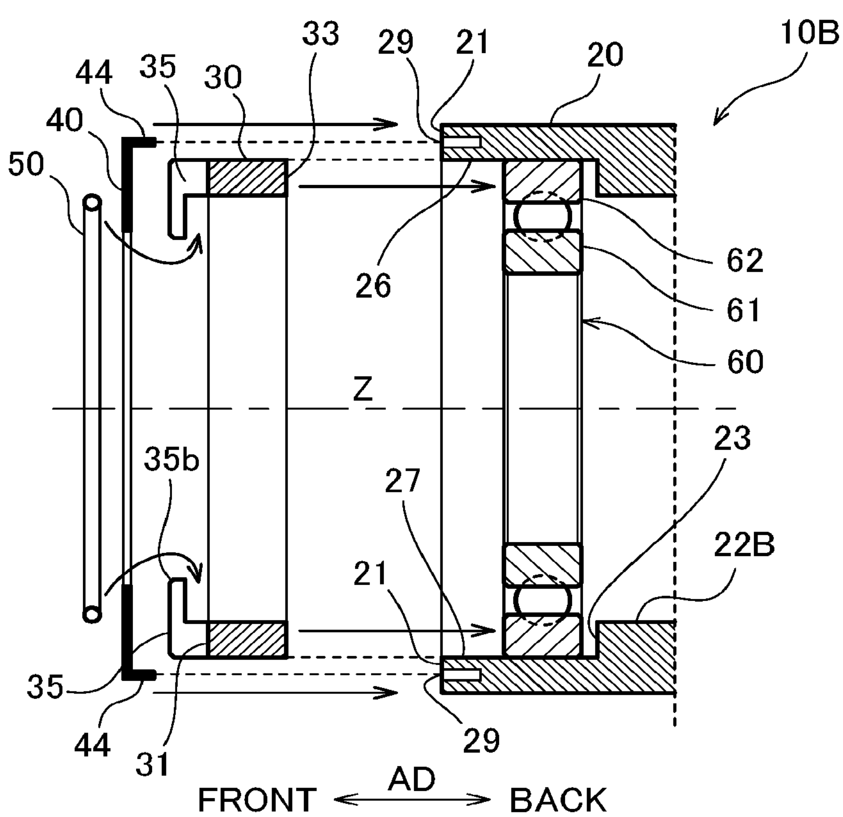
Figure 11B:
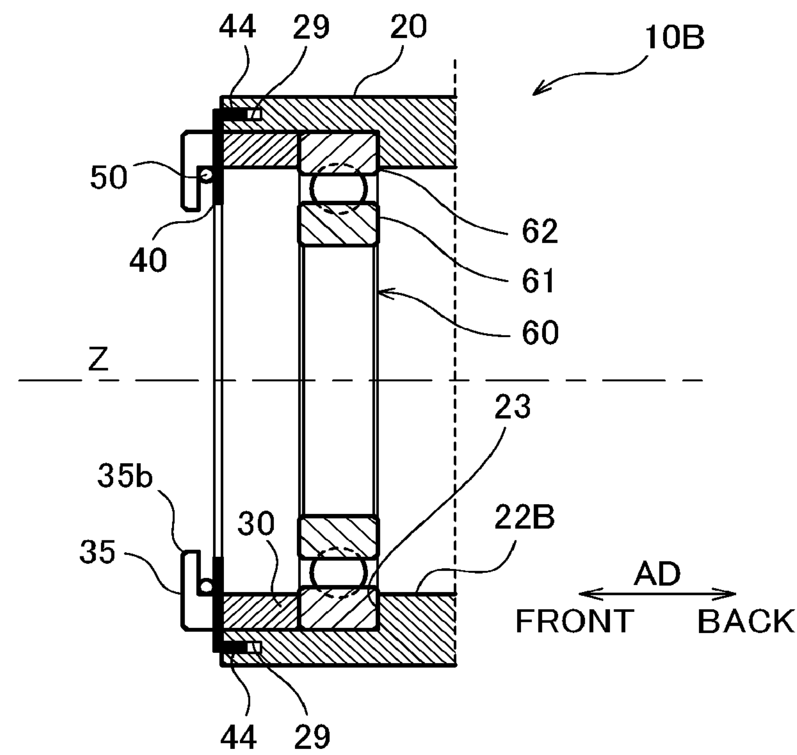

The object holding structure 10B according to the second embodiment will be described below. FIGS. 10A and 10B are cross-sectional views for explaining the assembly of the object holding structure 10B according to the second embodiment of the present disclosure, wherein FIG. 10A shows a state before assembly and FIG. 10B shows a state after assembly. FIGS. 11A and 11B are cross-sectional views showing a modification of the object holding structure 10B according to the second embodiment, wherein FIG. 11A shows a state before assembly and FIG. 11B shows a state after assembly. The object holding structure 10B according to the present embodiment holds the outer ring 62 of the bearing 60 as an example of an object to be held.

As shown in FIG. 10A, the object holding structure 10B includes a shaft 20 as an outer member, a lock nut 30 as an inner member, a key plate 40, and a retaining ring 50. The shaft 20 is a rod-shaped member (i.e., a tubular member) extending with the Z-axis as the central axis. At least, an attachment hole 26 is formed at the end 20*a* of the shaft 20. An outer ring 62 of a bearing 60 as an object to be held is fitted with the attachment hole 26, and a lock nut 30 is screwed into the attachment hole 26.

The shaft 20 has an end surface 21 and an annular projection 22B (stopper) including a first clamping surface 23 positioned radially inward of the end surface 21 when viewed from the axial direction AD. The annular projection 22B projects radially inward from an inner peripheral surface 27 of the shaft 20, which forms the attachment hole 26, and is formed in an annular shape with the Z-axis as the center. Instead of providing the annular projection 22B, a step may be provided so that the diameter (inner diameter) of the inner peripheral surface 27 of the shaft 20 increases at the front end 20*a* of the shaft 20, and the first clamping surface 23 may be formed by the step. In either case, after the outer ring 62 of the bearing 60 is attached to the shaft 20 from the end surface 21 side, further movement along the Z-axis is restricted by abutting on the first clamping surface 23.

With the bearing 60 attached to the shaft 20, the lock nut 30 is screwed into the attachment hole 26 of the shaft 20. The lock nut 30 is positioned radially inward of the shaft 20 and is provided movably in the axial direction AD with respect to the shaft 20.

As in the first embodiment, the lock nut 30 includes an end surface 31 and a second clamping surface 33 opposed to the first clamping surface 23 via an outer ring 62 of the bearing 60. In addition, the lock nut 30 includes hook portions 35 provided at intervals in the circumferential direction CD on the end surface 31. The hook portions 35 have claw portions 35*b* extending radially inwardly. When the lock nut 30 moves backward, the second clamping surface 33 abuts against the outer ring 62. Thereby, the movement of the outer ring 62 forward and backward is restricted and held. A structure such as a spacer may be sandwiched between the first clamping surface 23 and the inner ring 61. Similarly, a structure such as a spacer may be sandwiched between the second clamping surface 33 and the inner ring 61.

In the second embodiment, the key plate 40 and the retaining ring 50 are also installed. The configurations of the key plate 40 and the retaining ring 50 according to the second embodiment are the same as the configurations of the key plate 40 and the retaining ring 50 according to the first embodiment.

The key plate 40 is positioned by the hook portions 35 provided on the end surface 31 of the lock nut 30. The hook portions 35 are integrally formed with the lock nut 30. The configuration of each hook portion 35 is the same as that of the hook portion 25 according to the first embodiment. Accordingly, the retaining ring 50 is held between the claw portions 35*b* (see FIGS. 10A and 10B) of the hook portions 35 and the key plate 40, wherein the claw portions 35*b* have the same shapes as the claw portions 25*b*.

In the second embodiment, the end surface 21 of the shaft 20 is provided with projections 28, and the key plate 40 is provided with outer tabs 44 projecting radially outwardly. The projections 28 have the same function as the projections 34 of the first embodiment. The projections 28 are formed integrally with the shaft 20 and are arranged at intervals on the end surface 21 of the shaft 20. On the other hand, the outer tabs 44 extend from the outer edge of the key plate 40 to positions between mutually adjacent two of the projections 28. The actions and effects of the projections 28 and the outer tab 44 are the same as those of the first embodiment. That is, it is possible to restrict the rotation of the lock nut 30.

As shown in FIG. 11A, instead of providing projections 28, recesses 29 may be provided on the end surface 21 of the shaft 20. The outer tabs 44 may be protruded from the first ring 41 toward the recesses 29 such that they are inserted into the recesses 29. In this case, the recesses 29 are arranged at predetermined intervals in the circumferential direction CD and extend in the axial direction AD by a predetermined depth. The recesses 29 may be grooves surrounded by the end surface 21, otherwise may be provided as step portions (notches) on the radially outward edge or radially inward edge of the end surface 21. On the other hand, the outer tabs 44 are formed, for example, by bending with respect to a plane including the first ring 41. The outer tabs 44 have cross-sectional shapes that can be inserted into the recesses 29. Therefore, as shown in FIG. 11B, when the key plate 40 is attached to the lock nut 30, the outer tabs 44 are inserted into the recesses 29, thereby restricting the rotation of the lock nut 30.

Similar to the first embodiment, the key plate 40 according to the present embodiment also has a second ring 42 provided radially inward of the hook portions 35 when viewed from the axial direction AD. Therefore, as described above, when the retaining ring 50 is attached, even if a part of the retaining ring enters an area surrounded by the second ring 42, the second ring 42 immediately contacts the retaining ring 50 and further entry is restricted. Therefore, it is possible to prevent mis-attachment of the retaining ring 50 and stably hold the inner ring 61 of the bearing 60 as an object to be held while suppressing the looseness of the lock nut 30.

The hook portions 35 and the lock nut 30 are integrally formed from the same base material. In addition, when the projections 28 are provided in the shaft 20, the projections 28 and the shaft 20 are integrally formed from the same base material. Therefore, it is possible to suppress excessive increase in the number of parts and the weight. In addition, it is possible to suppress excessive expansion of the occupied space of the object holding structure 10B.

Modified Example

Some modified examples of the key plate described above will be described. FIG. 12A to 12D are views showing several modified examples of the key plate 40 according to each embodiment, wherein FIG. 12B is a cross-sectional view of the first modified example along the axial direction, FIG. 12B is a cross-sectional view of the second modified example along the axial direction, FIG. 12C is a front view showing a part of the third modified example, and (d) is a cross-sectional view of the third modified example along the circumferential direction.

Figure 12A:
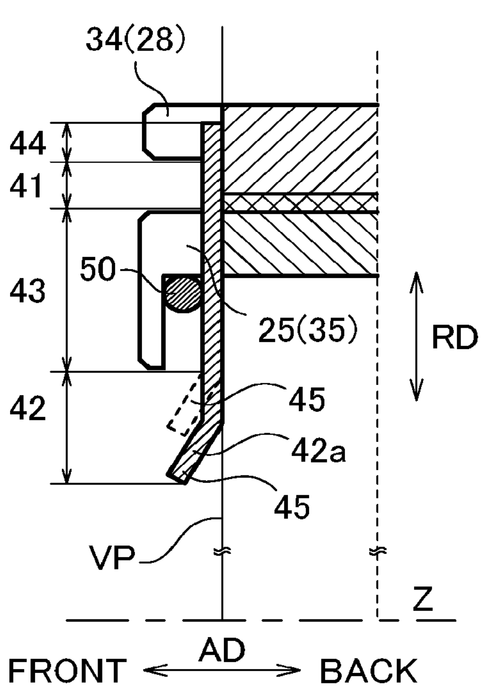
Figure 12B:
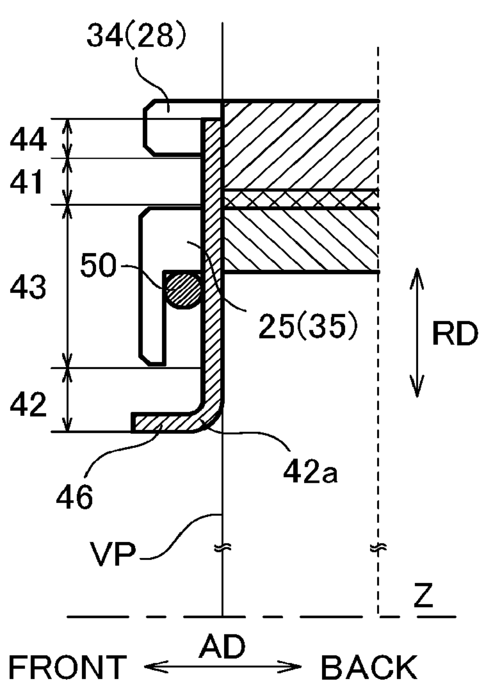
Figure 12C:
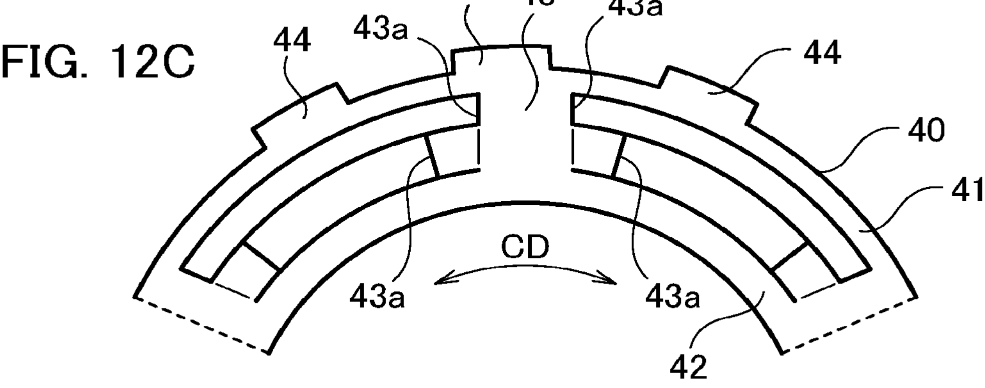
Figure 12D:
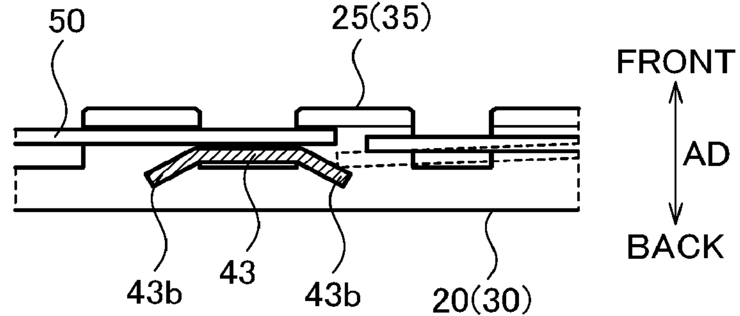

As shown in FIG. 12A, the second ring 42 of the key plate 40 may include an inclined portion (inclined plane) 45 provided at the inner edge portion 42*a* radially inward of the second ring 42. The inclined portion 45 is formed in an annular shape extending in the circumferential direction CD. The inclined portion 45 is inclined to a side where the retaining ring 50 is located with respect to a virtual plane VP (i.e., to the virtual plane VP as a reference) including the first ring 41 in the axial direction AD so that a distance from the virtual plane VP increases as the inclined portion 45 approaches the inclined portion 45. That is, the inclined portion 45 is a part of a side surface (cone surface) when a conical body with the Z-axis as the center line and the apex thereof positioned in front of the virtual plane VP is assumed. As shown by the dashed line in FIG. 12A, the inclined portion 45 may be formed as the whole of the second ring 42. In other words, the inclined portion 45 may constitute the whole of the second ring 42. Both cases can guide the retaining ring 50 to the inside of the hook portions 35 by the contact of the inclined portion 45 with the retaining ring 50 when the retaining ring 50 is attached. Accordingly, it is possible to improve workability when the retaining ring 50 is attached.

As shown in FIG. 12B, the second ring 42 may include a tongue portion 46 provided radially inward of the inner edge portion 42*a*. The tongue portion 46 is formed in an annular shape extending in the circumferential direction. The tongue portion 46 projects from the inner edge portion 42*a* on the side where the retaining ring 50 is located with respect to the virtual plane VP (i.e., to the virtual plane VP as a reference) including the first ring 41 in the axial direction AD so as to be away from the virtual plane VP. In the second modified example, as in the first modified example, the retaining ring 50 can be guided to the inside of the hook portions 35 to improve workability when attaching the retaining ring 50.

As shown in FIG. 12C, each of the inner tabs 43 may include a pair of flange portions 43*b*, 43*b*. The flange portions 43*b*, 43*b* extend obliquely from the edges 43*a*, 43*a* on both sides in the circumferential CD toward a side opposite to the side where the retaining ring 50 is located relative to the virtual plane VP including the first ring 41. When the C-ring described above is used as the retaining ring 50, by abutting an end portion of the C-ring on the flange portion 43*b*, it is possible to prevent a portion of the C-ring from being located behind the key plate 40 and to avoid a condition similar to the mis-attachment condition shown in FIG. 9B.

It should be noted that the present disclosure is not limited to the embodiments described above, but is illustrated by the description of the claims and includes all changes within the meaning and scope of the description and equality of the claims.

What is claimed is:

1. An object holding structure comprises:
- an inner member extending in an axial direction, including:
  - an end surface,
  - a first clamping surface located radially outward of the end surface when viewed from the axial direction, and
  - hook portions arranged in a circumferential direction at intervals on the end surface and having claw portions extending radially inwardly;
- an outer member located radially outward of the inner member and movably provided in the axial direction relative to the inner member, the outer member including an end surface and a second clamping surface facing the first clamping surface through an object;
- a key plate contactable with each of the end surface of the inner member and the end surface of the outer member;
- a retaining ring held between the key plate and the claw portions of the hook portions; and wherein the key plate includes:
- a first ring facing the end surface of the outer member;
- a second ring provided radially inward of the hook portions when viewed from the axial direction;
- inner tabs located between the hook portions in the circumferential direction and linking the first ring and the second ring.

2. The object holding structure according to claim 1, wherein
- the second ring includes an inclined portion provided at an inner edge portion located radially inward,
- the inclined portion is formed in an annular shape extending in the circumferential direction, and
- the inclined portion is inclined to a side where the retaining ring is located with respect to a virtual plane including the first ring so that a distance from the virtual plane increases as the inclined portion approaches a center of the inclined portion.

3. The object holding structure according to claim 2, wherein
- the inclined portion is entirely formed in the second ring.

4. The object holding structure according to claim 1, wherein
- the second ring includes a tongue portion provided at an inner edge portion located radially inwardly,
- the tongue portion is formed in an annular shape extending in the circumferential direction, and
- the tongue portion protrudes from the inner edge portion on a side where the retaining ring is located relative to the virtual plane so that the tongue portion gets away from a virtual plane including the first ring.

5. The object holding structure according to claim 1, wherein
- each of the inner tabs includes a pair of flanges portions obliquely extending from edges on both sides in the circumferential direction toward a side opposite to the side where the retaining ring is located relative to the virtual plane including the first ring.

6. The object holding structure according to claim 1, wherein
- the key plate is formed of a single metal plate.

7. The object holding structure according to claim 1, wherein
- the outer member includes projections on the end surface of the outer member, located radially outward of the first ring of the key plate,
- the key plate includes outer tabs located radially outward of the first ring,
- the projections are arranged at intervals in the circumferential direction, and
- each of the outer tabs extends radially outward from the first ring at least to a position between the projections.

8. An object holding structure comprises:
- an outer member extending in an axial direction, including:
  - an end surface, and
  - a first clamping surface located radially inward of the end surface when viewed from the axial direction;
- an inner member located radially inward of the outer member and movably provided in the axial direction relative to the outer member, the inner member including:
  - an end surface,
  - a second clamping surface facing the first clamping surface through an object, and
  - hook portions arranged in a circumferential direction at intervals on the end surface and having claw portions extending radially inwardly;
- a key plate contactable with each of the end surface of the inner member and the end surface of the outer member;
- a retaining ring held between the key plate and the claw portions of the hook portions; and wherein the key plate includes:
- a first ring facing the end surface of the outer member;
- a second ring provided radially inward of the hook portions when viewed from the axial direction;
- inner tabs located between the hook portions in the circumferential direction and linking the first ring and the second ring.

9. The object holding structure according to claim 8, wherein
- the second ring includes an inclined portion provided at an inner edge portion located radially inwardly,
- the inclined portion is formed in an annular shape extending in the circumferential direction, and
- the inclined portion is inclined to a side where the retaining ring is located with respect to a virtual plane including the first ring so that a distance from the virtual plane increases as the inclined portion approaches a center of the inclined portion.

10. The object holding structure according to claim 9, wherein
- the inclined portion is entirely formed in the second ring.

11. The object holding structure according to claim 8, wherein
- the second ring includes a tongue portion provided at an inner edge portion located radially inwardly,
- the tongue portion is formed in an annular shape extending in the circumferential direction, and
- the tongue portion protrudes from the inner edge portion on a side where the retaining ring is located relative to the virtual plane so that the tongue portion gets away from a virtual plane including the first ring.

12. The object holding structure according to claim 8, wherein each of the inner tabs includes a pair of flanges portions obliquely extending from edges on both sides in the circumferential direction toward a side opposite to the side where the retaining ring is located relative to the virtual plane including the first ring.

13. The object holding structure according to claim 8, wherein the key plate is formed of a single metal plate.

14. The object holding structure according to claim 8, wherein the outer member includes projections on the end surface of the outer member, located radially outward of the first ring of the key plate, the key plate includes outer tabs located radially outward of the first ring, the projections are arranged at intervals in the circumferential direction, and each of the outer tabs extends radially outward from the first ring at least to a position between the projections.

* * * * *